(12) United States Patent
Cheng et al.

(10) Patent No.: US 10,389,854 B2
(45) Date of Patent: Aug. 20, 2019

(54) METHOD AND SYSTEM FOR FORMING AN AD-HOC NETWORK OVER HETEROGENEOUS PROTOCOLS

(71) Applicant: Infinet LLC, Naperville, IL (US)

(72) Inventors: Yu Cheng, Naperville, IL (US); Kecheng Liu, Chicago, IL (US)

(73) Assignee: Infinet, LLC, Naperville, IL (US)

( * ) Notice: Subject to any disclaimer, the term of this patent is extended or adjusted under 35 U.S.C. 154(b) by 0 days.

(21) Appl. No.: 15/624,466

(22) Filed: Jun. 15, 2017

(65) Prior Publication Data

US 2018/0367381 A1    Dec. 20, 2018

(51) Int. Cl.
*H04W 84/00* (2009.01)
*H04L 29/06* (2006.01)
*H04W 84/18* (2009.01)

(52) U.S. Cl.
CPC ............. *H04L 69/08* (2013.01); *H04W 84/18* (2013.01)

(58) Field of Classification Search
CPC ..... H04W 4/005; H04W 4/008; H04W 84/18; H04W 12/08
See application file for complete search history.

(56) References Cited

U.S. PATENT DOCUMENTS

| 8,885,641 | B2* | 11/2014 | Raman | .................. | H04L 45/745 370/389 |
| 2003/0212821 | A1* | 11/2003 | Gillies | .................. | H04L 41/046 709/238 |
| 2005/0053094 | A1 | 3/2005 | Cain et al. | | |
| 2005/0190778 | A1* | 9/2005 | Ozluturk | .................. | H04L 45/22 370/406 |
| 2006/0126514 | A1* | 6/2006 | Lee | ..................... | H04L 43/0811 370/238 |
| 2014/0200036 | A1* | 7/2014 | Egner | ................... | H04W 8/245 455/456.3 |

(Continued)

OTHER PUBLICATIONS

Lien, Yao-Nan et al.; "A Walkie-Talkie-Like Emergency Communication System for Catastrophic Natural Disasters"; Pervasive Systems, Algorithms, and Networks (ISPAN), 2009 10th International Symposium; Dec. 14-16, 2009; 6 pages; Kaohsiung, Taiwan.

(Continued)

*Primary Examiner* — Mohamed A Kamara
(74) *Attorney, Agent, or Firm* — Richards Patent Law, P.C.

(57) ABSTRACT

A system for forming an ad-hoc network among devices includes a wireless device that utilizes one or more connection protocols; a protocol bridging mechanism operating on one or more communication layers selected from the group of: an application layer, a transport layer, a data link layer, a physical layer and a network layer, wherein the one or more connection protocols connects to other wireless devices through the protocol bridging mechanism; and a controller stored within the wireless device. The system further includes a memory including program instructions executable by the controller that cause the controller to connect to the first nearby wireless device through the first communication protocol; connect to the second nearby wireless device through the second communication protocol; and transmit data between the first nearby wireless device and the second nearby wireless device through the protocol bridging mechanism.

11 Claims, 8 Drawing Sheets

(56) References Cited

U.S. PATENT DOCUMENTS

2015/0245412 A1* 8/2015 Tyson .................. H04L 43/065
370/338
2017/0150418 A1* 5/2017 Kim ..................... H04W 40/20

OTHER PUBLICATIONS

Casetti, C. et al.; "Content-centric Routing in Wi-Fi Direct Multi-group Networks"; arXiv:1412.0880v1; Dec. 2, 2014; 13 pages.
Kandiyal, Bhaskar et al.; "Deployment and Testing of MANET on Android Devices"; International Journal of Enhanced Research in Science, Technology & Engineering, vol. 3, Issue 4; Apr. 2014; 4 pages; Delhi, India.
Funai, Colin et al.; "Supporting Multi-hop Device-to-Device Networks Through WiFi Direct Multi-group Networking"; arXiv:1601.00028v1; Dec. 31, 2015; 7 pages.
Liu, Kecheng et al.; "Development of Mobile Ad-hoc Networks over Wi-Fi Direct with off-the-shelf Android phones"; 2016 IEEE International Conference on Communications; May 26-27, 2016; Kuala Lumpur, Malaysia; 6 pages.
Thomas, Josh et al.; "Off Grid Communications with Android Meshing the Mobile World"; 2012 IEEE Conference on Technologies for Homeland Security (HST); Nov. 13-15, 2012; Waltham, MA; 4 pages.
"MANET Manager" mobile application by stoker, available at https://play.google.com/store/apps/details?id=org.span&hl=en, accessed Oct. 10, 2017, 4 pages.
"FireChat" mobile application by Open Garden, available at https://play.google.com/store/apps/details?id=com.opengarden.firechat&hl=en, accessed Oct. 17, 2017.

* cited by examiner

METHOD AND SYSTEM FOR FORMING AN AD-HOC NETWORK OVER HETEROGENEOUS PROTOCOLS

BACKGROUND OF THE INVENTION

The present subject matter relates generally to a method and system for forming a network between devices. More specifically, the present invention relates to methods and systems of forming an ad-hoc network.

During normal use, wireless devices communicate with one another through the use of cellular towers and other access points of a wireless network. A wireless network consists of a number of access points, each broadcasting a wireless signal that computers and other wireless devices can detect and join. Access points may be connected to wired networks, such as an internet connection. Wireless technologies that support wireless networking include Wi-Fi, Bluetooth, and 3G and 4G cellular networks.

Wireless technology presents problems to users when they are unable to join a network. While cities typically have sufficient coverage, some rural areas may have stretches that are not covered by a wireless network. Additionally, access points may be damaged or compromised during natural disasters or other emergency situations. Other possible radio interference could result from weather, other wireless devices, or obstructions like concrete walls.

Without wireless technology, wireless devices can communicate through a wireless ad hoc network composed of individual devices communicating with each other directly (i.e., without going through a centralized point). Device-to-device (D2D) or peer-to-peer (P2P) communications utilize wireless technology such as Bluetooth. However, the use of many devices to create the network also means that the loss of one device breaks a link in the connection. The bandwidth of each wireless channel is also limited. The ad hoc network is further limited by the battery life of any individual link.

Currently, only rooted devices are capable of functioning in D2D communications over multiple hops. Rooted devices are devices running the Android mobile operating system on which users have privileged control over various Android subsystems. The process of "rooting" gives users the ability to alter or replace system applications and settings, run specialized applications, or perform other operations that are not available to the normal user. The downside to rooting a phone is losing the security and integrity of the operating system provided by the provider, as well as voiding the warranty from the provider. Further, to root a smartphone and enable network functionality on the phone requires extensive knowledge on software programming and computer architecture, which is uncommon for the average user. Additionally, because rooting is specific to only Android devices, an ad-hoc network based on rooted devices cannot include non-Android devices.

Accordingly, there is a need for a dynamic wireless ad hoc network that self-forms without any requirements on the individual device, as described herein.

BRIEF SUMMARY OF THE INVENTION

To meet the needs described above and others, the present disclosure provides a network of devices that self-forms and self-heals without any pre-configuration on the device; the device may be equipped with networking interfaces operating over heterogeneous network protocols.

The mechanism that executes necessary protocol or computing operations to enable communications between network segments that operate over heterogeneous protocols. The mechanism may involve multiple layers in the OSI model including but not limited to physical layer, link layer, network layer, or transport layer. PBM operations include but not limited to port forwarding, tunneling, reframing and decoding and reformatting.

An object of the invention is to provide a network with a topology that is dynamic in that the devices can leave and join the network without affecting the communications between the remaining devices.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
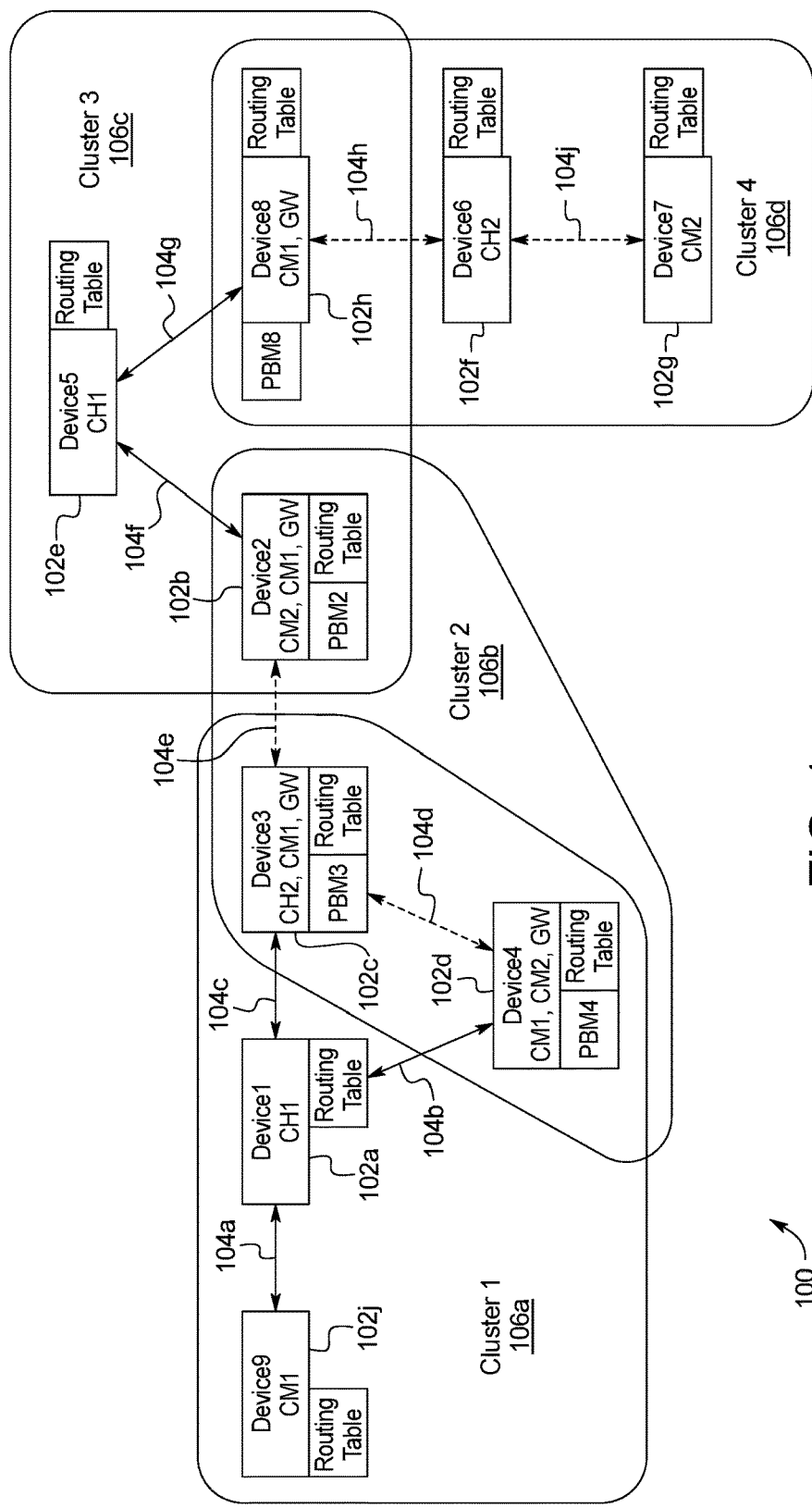
FIG. 1 is a schematic of an example embodiment of a mobile ad-hoc network in accordance with the present application.

FIG. 1 illustrate an example of a self-forming mobile ad-hoc network 100 as described in the present application. The ad-hoc network includes a plurality of off-the-shelf devices, each connected to one another through various connection means such as Wi-Fi tethering and Wi-Fi P2P. Each device can send data following the standard TCP/IP protocol. The transmission methods among each node are Wi-Fi standard transmissions.

In the embodiment illustrated in FIG. 1, the network 100 includes nine devices 102a-102j (labeled Device 1-Device 9, respectively). Each device 102a-102j connects to one or more other devices 102a-102j through connection means 104a-104j such as Wi-Fi, Wi-Fi P2P, or another suitable connection means. The devices 102a-102j may be any terminal that supports direct wire/wireless connections described herein, including but not limited to a smartphone, a wearable device, a sensor, a printer, a computer, etc.

At any given moment, the individual devices 102a-102j of the network 100 as illustrated in FIG. 1 can be grouped into clusters 106a-106d of devices, each of which includes three or more devices 102a-102j connected to one another through a singular link layer connection 104a-104j. Each cluster 106a-106d includes at least one cluster head (CH) device that connects at least two cluster member (CM) devices. Further, each cluster 106a-106d also includes a gateway device that connects with two or more devices utilizing two or more different connection means. Each device 102a-102j can serve in more than one capacity as a CH device, a CM device, and/or a gateway device. For example, a single device may act as a CM device of a first cluster, a CH device of a second cluster, and a gateway device between adjoining clusters.

Figure 2A:
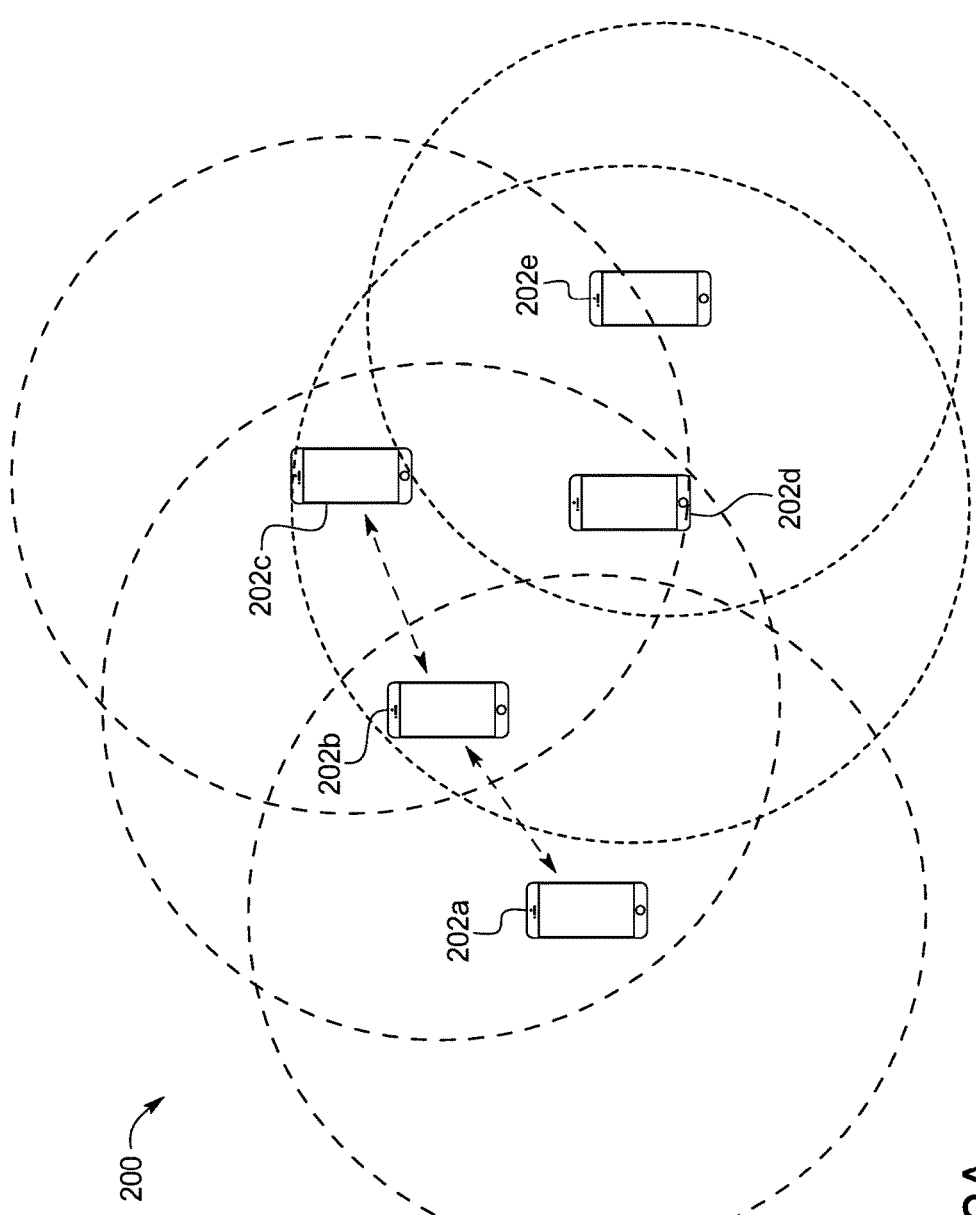
FIG. 2A is a diagram illustrating the relationships in a cluster of a network of the present application.

FIG. 2A illustrates the relationships between a CH device, CM devices, and unrelated devices in terms of signal range. The network 200 of FIG. 2A includes five devices 202a-202e. The CH device 202b provides a link layer connection to CM device 202a and CM device 202c. CM device 202a is outside of the signal of CM device 202c, and vice versa. The signal of CH device 202b is within the signals of both CM device 202a and CM device 202c. CM device 202a and CM device 202c therefore communicate through CH device 202b. Unclustered Device 1 202d is not equipped with the communication means of the cluster (i.e., has not formed a wireless connection), but is detectable by the signals of CH device 202b and of CM devices 202a and 202c; it is therefore detectable but not in the cluster. Unclustered Device 2 202e is not equipped with the communication means of the cluster (i.e., has not formed a wireless connection), and is not detectable by the signals of CH device 202b and CM devices 202a and 202c; it is therefore undetectable and not in the cluster.

Figure 2B:
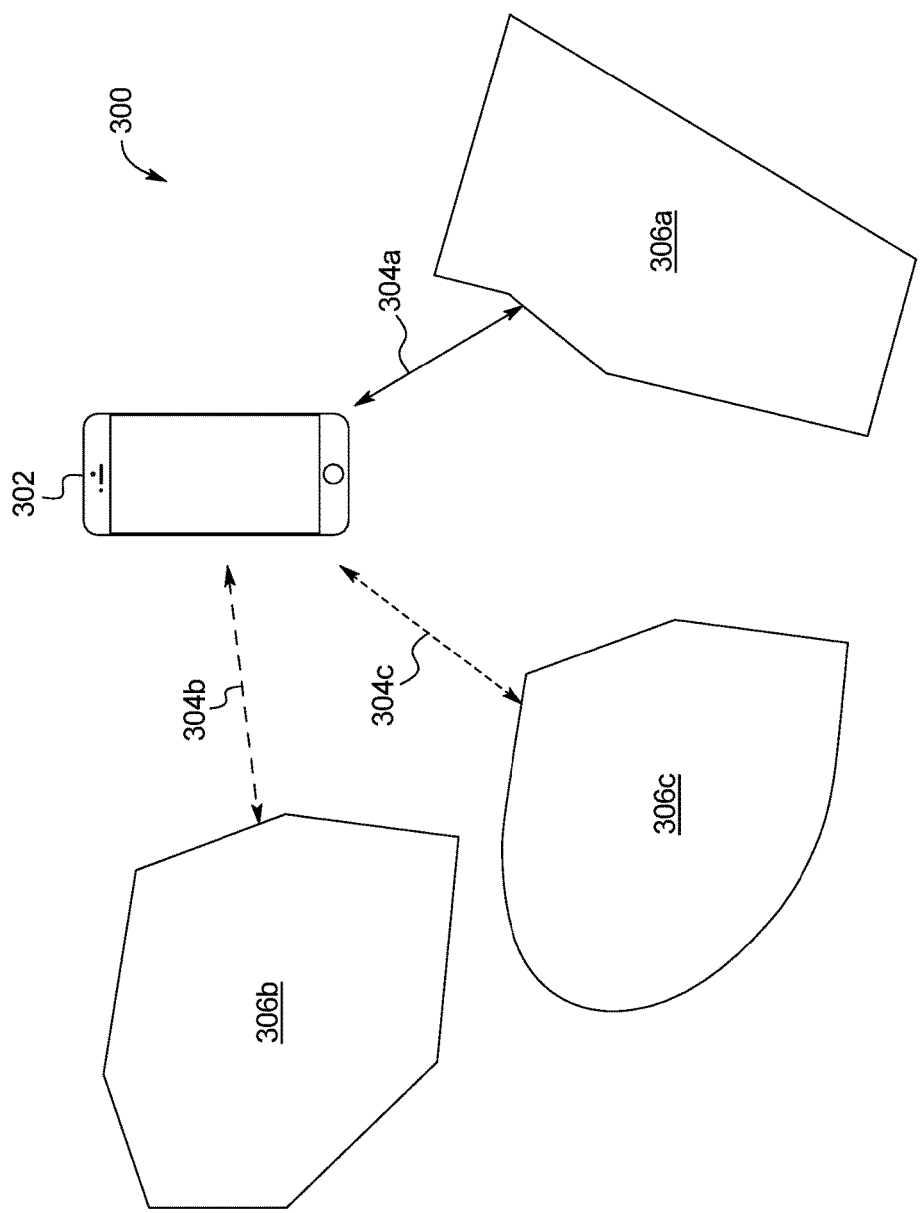
FIG. 2B is a diagram illustrating the relationships between gateway member with various clusters of a network of the present application.

In FIG. 2B, the network 300 illustrates the relationships between a gateway device 302 and clusters 1, 2, and 3 306a-306c. The gateway device 302 includes an IP on multiple clusters' interfaces so that it connects with each of the Clusters 1, 2, and 3 304a-304c. The gateway device 302 connects to Cluster 1 304a through Wi-Fi tethering 304a. The gateway device 302 connects to Cluster 2 304b through Wi-Fi P2P 304b. The gateway device 302 connects to Cluster 3 304c through a third networking protocol 304c.

Referring back to FIG. 1, the devices 102a-102j of the network 100 form four clusters, Clusters 1-4, 106a-106d. The relationships between the devices 102a-102j within each cluster 106a-106d are provided below in Table 1.

TABLE 1

| Clusters of Network 100 | |
|---|---|
| Cluster 1 | |
| Cluster Head | Device 1 102a |
| Cluster Members | Device 9 102j |
|  | Device 4* 102d |
|  | Device 3* 102c |
| Cluster 2 | |
| Cluster Head | Device 3* 102c |
| Cluster Members | Device 4* 102d |
|  | Device 2* 102b |
| Cluster 3 | |
| Cluster Head | Device 5 102e |
| Cluster Members | Device 2* 102b |

TABLE 1-continued

| Clusters of Network 100 | |
|---|---|
|  | Device 8* 102h |
| Cluster 4 | |
| Cluster Head | Device 6 102f |
| Cluster Members | Device 8* 102h |
|  | Device 7 102g |

*indicates a gateway device

The network of FIG. 1 also indicates that the connection types 104a-104c within Cluster 1 106a is different from the connection types 104d, 104e within Cluster 2 106b. Device 3 102c and Device 4 102d interact with both Clusters 1 and 2 106a, 106b, and therefore are gateway devices. Similarly, Device 2 102b is a gateway device as it engages with both Clusters 2 and 3 106b, 106c, which use different connection means. Finally, Device 8 102h is a gateway device for Clusters 3 and 4 106c, 106d, using different connection means. The various connections types are described below with respect to FIG. 3. Because each gateway device interfaces with two different connection means, the preferred connection means for one direction of communication may be different than the preferred connection means in the other direction of communication.

Figure 4:
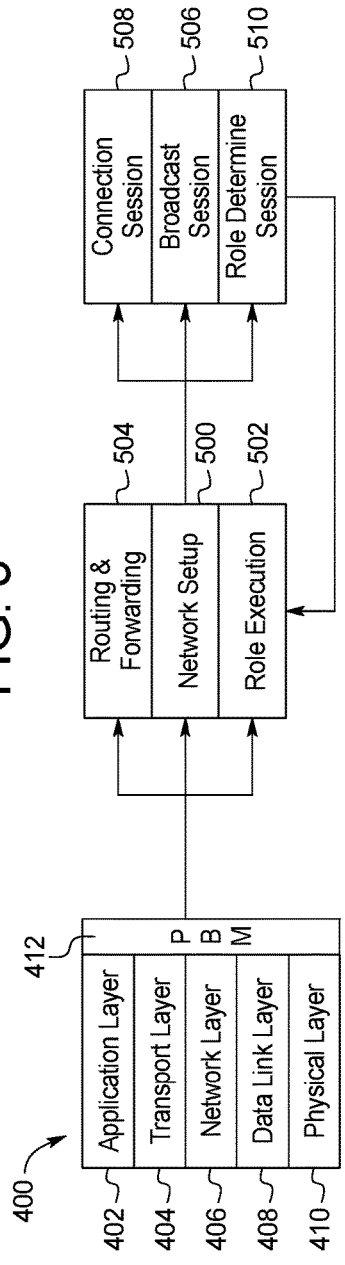
FIG. 4 is a schematic of protocols performed by a device within a network of the present application.

Generally, the PBM is the mechanism that creates a single aggregate network from multiple communications networks or network segments that run different protocols. Referring to FIG. 4, the network 100 is based on the internet 5-layer network model 400, a conceptual model that characterizes the communication functions of a telecommunications or computing system. The 5-layer network model includes the communication layers 402-410 described in Table 2. The PBM 412 enables data to be transmitted between different protocols operating on different communication layers 402-410.

| Layer | Name | Function |
|---|---|---|
| 5 | Application Layer 402 | Governs how two applications work with each other; serves as the window for users and application processes to access network services. |
| 4 | Transport Layer 404 | Governs aspects of end-to-end communications between two end hosts; provide transparent transfer of data from a source end open system to a destination open system. |
| 3 | Network Layer 406 | Governs the transmission of packets across an internet, typically by sending them through several routers along the route. |
| 2 | Data Link Layer 408 | Governs the transmission of frames across a single network. |
| 1 | Physical Layer 410 | Governs transmission between adjacent devices connected by a transmission medium. |

As mentioned previously, the connection types may be Wi-Fi, Wi-Fi tethering, Wi-Fi P2P, Bluetooth, and 3G and 4G cellular networks, among others. Wi-Fi connections, including Wi-Fi, Wi-Fi tethering, and Wi-Fi P2P, occur on the network layer 406. A port connection type occurs on the transport layer 404. The PBM 412 is used to connect devices that communicate through different connection protocols.

Figure 3:
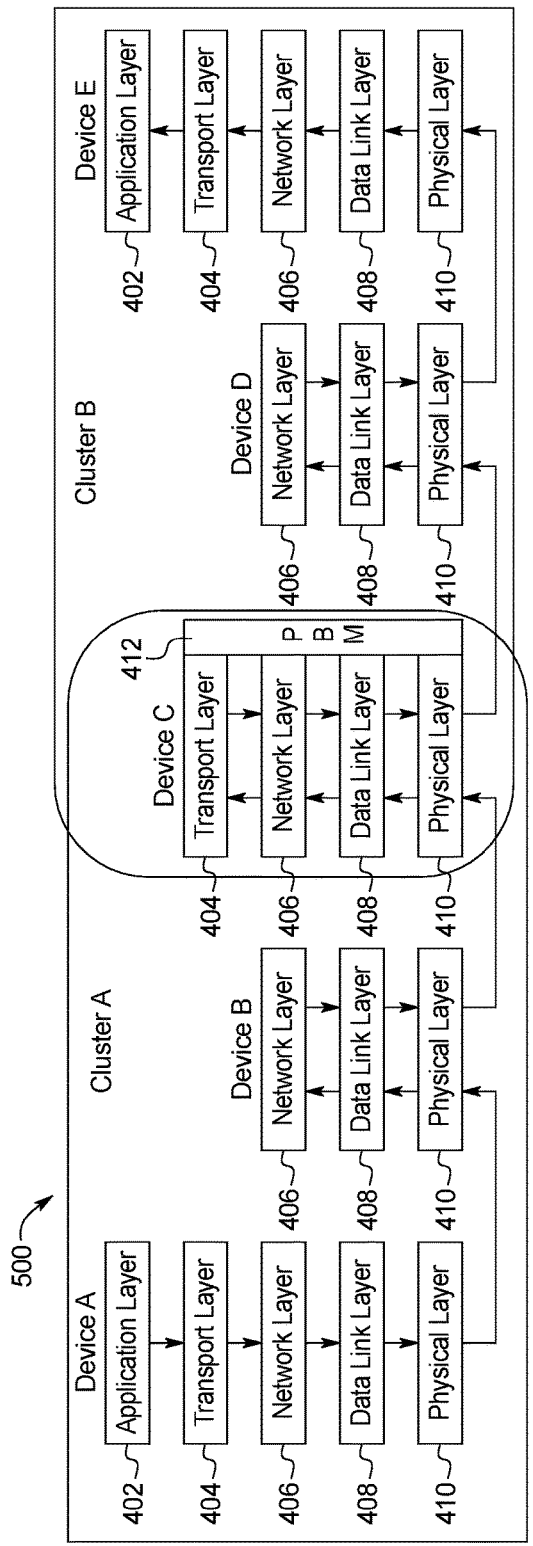
FIG. 3 is a schematic of a series of protocol bridging mechanism (PBM) connections within a network of the present application.

FIG. 3 illustrates the pathway undertaken between adjacent differing protocols within a network 500. The network 500 includes Devices A-E broken into Clusters A and B running first and second protocols, respectively. Cluster A includes Devices A-C, while Cluster B includes Devices C-D. As shown in FIG. 3, Device A, operating on the first protocol, sends a data packet to Device E, operating on the second protocol.

Specifically, each of Devices A, B, D, and E transfers data using either the first protocol or the second protocol. Device C serves as the gateway device between Clusters A and B, running both of the first and second protocols. The data descends and ascends the connection layers at each device. At Device C, the data is routed through the PBM 412 operating on the communication 404-408.

Once the connection is made to a device on a layer 402-410 of the PBM 400, the processor on the device performs three primary functions: (1) network setup 500, (2) role execution 502, and (3) routing and forwarding 504, as shown in FIG. 4. Each device 102 begins with the network setup 500 in order to assign a role to the device 102. The network setup 500 includes three repeating, sequential sessions: (a) broadcast session 506, (b) connection session 508, and (c) role determine session 510. After the network setup 500, the device 102 moves onto the role execution function 502 to assign protocols specific to the assigned role. Finally, in the routing and forwarding function 504, the device constructs a routing table identify the route of information between specific devices 102.

More specifically, each device in the ad-hoc network includes a controller and a memory including instructions that, when executed by the controller, cause the controller to run the algorithms and protocols described herein to create a self-forming, self-healing network. Each of the functions 500, 502, and 504 are constantly or repeatedly running on each device so that the overall network 100 is maintained when one of the connected devices loses connection. If a device loses connection, the protocols of the network of the present application provide for constant updates to the broadcast message of each device (in the broadcasting session 506), the establishment of each connection between devices within the network (in the connection session 508), the determined roles of each device (in the role determine session 510), the performance of each role's protocols (in the role execution function 502) and updated routing table and PBM setups for each device (routing and forwarding 504). This means that all devices connected within the network communicate up-to-date information to one another in order to maintain connections throughout the network as devices are added and removed from the network.

Figure 5:
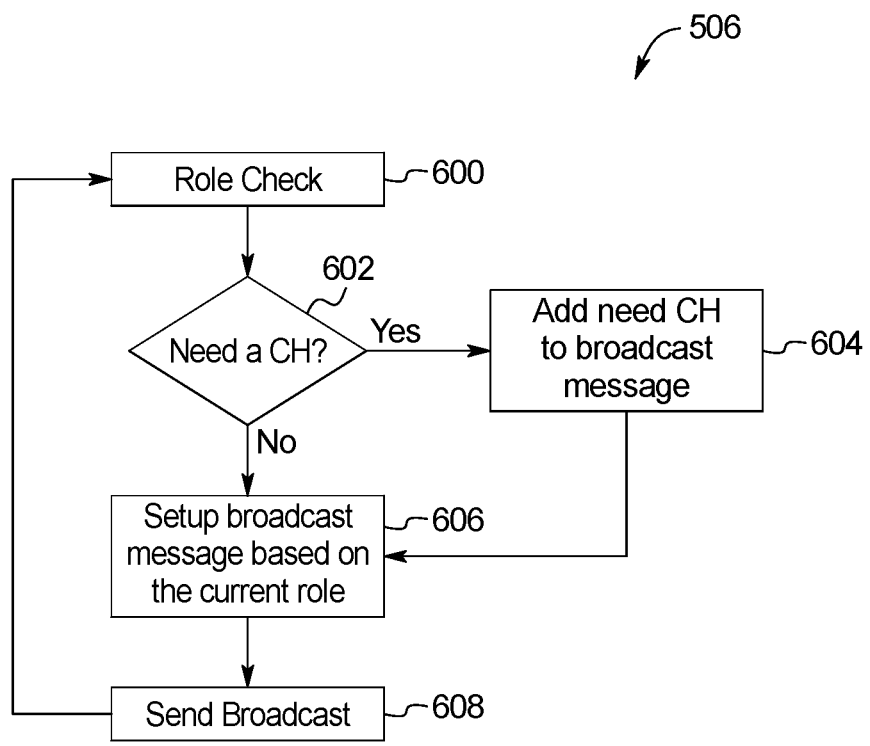
FIG. 5 is a flowchart illustrating a broadcast session of the protocols of FIG. 4.

Referring to the broadcast session 506 of the network setup 500 illustrated in FIG. 5, the device 102 sends a broadcast to signal to any nearby network or device that the device 102 wants to connect. The broadcast message may include information needed by other devices to determine what type of connection may be made. This information may include, but is not limited to, battery levels, which (if any) nearby devices are detected but not yet connected, signal strength, and priority.

In the first step 600 of the broadcast session 506 of FIG. 5, the device 102 inputs the role of the device. The role of the device may be one of the following: no role, cluster head device, cluster member device, and gateway device. In the next step 602, the device 102 determines whether the device 102 needs a cluster head to connect to the network. If yes, a request for a cluster head is added to the broadcast message in step 604 before proceeding to the next step 606 to setup the broadcast message. If no, the device moves onto step 606 of setting up the broadcast message. In the following step 608, the device sends the broadcast message.

Figure 6:
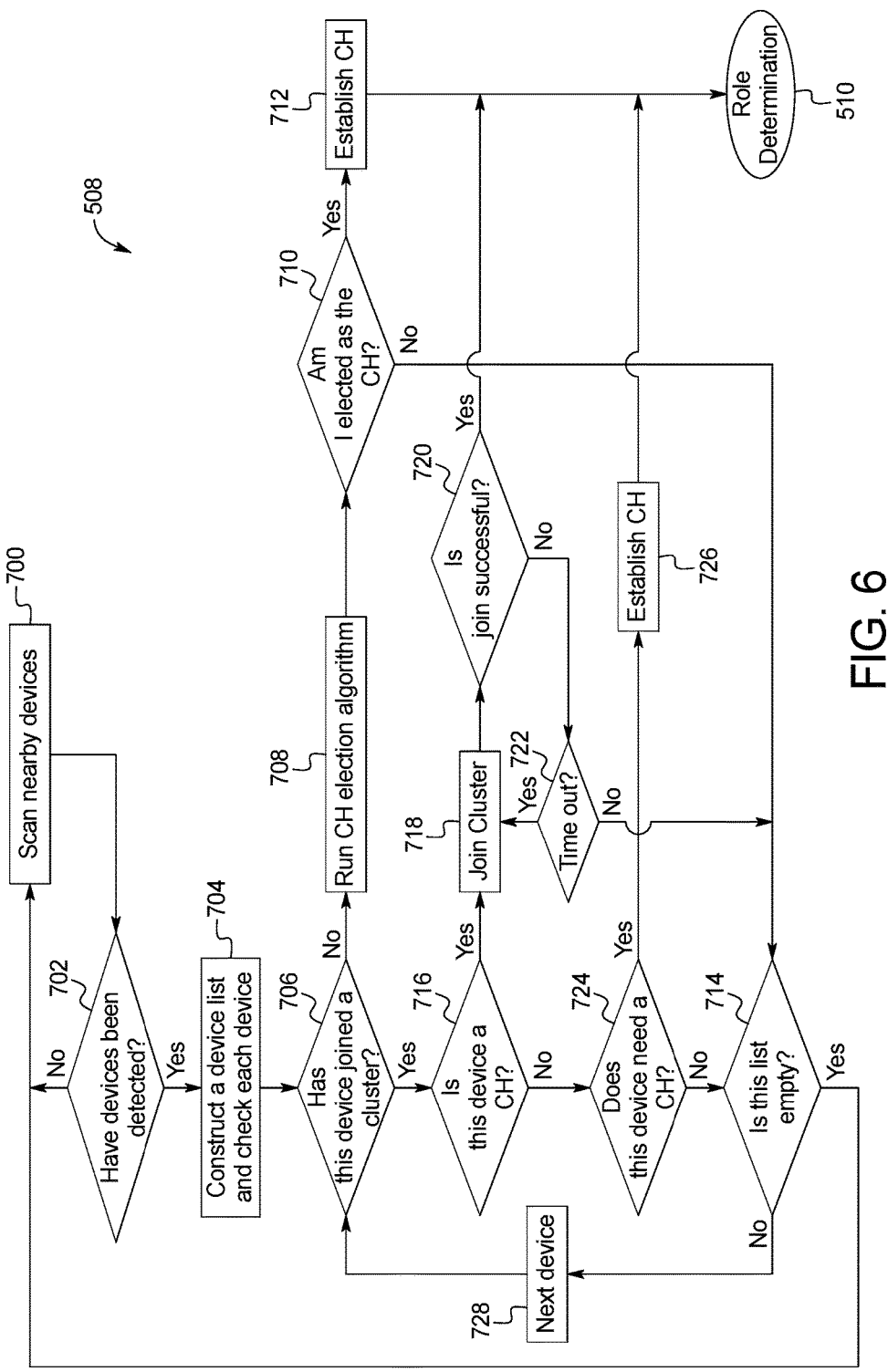
FIG. 6 is a flowchart illustrating a connection session of the protocols of FIG. 4.

The device 102 then moves onto the connection session 506 shown in FIG. 6, where the device 102 determines whether it can connect to an existing cluster 106 as a cluster head or a cluster member. In the first step 700, the device scans nearby devices and if none are found in the next step 702, the device 102 returns to step 700 and continues to scan. If nearby devices are found in step 702, the device 102 constructs a nearby device list and checks each nearby device for its role in a cluster in step 704. In the next step 706, the device 102 determines whether the first nearby device has joined a cluster. If no, then the device 102 runs a cluster head election algorithm in step 708, and then determines whether the device is elected as the cluster head in step 710. If yes, the device 102 is established as the cluster head in step 712 and a cluster is created. If no, the device 102 then determines whether the nearby device list has any remaining nearby devices to check for connection in step 714. If the device 102 is not elected as the cluster head in step 710, then the device 102 determines whether the nearby device list has any remaining nearby devices to check for connection in step 714. If the device 102 determines that there are no more nearby devices to check for connection, the device 102 returns to step 700 and scans for nearby devices. If yes, the device selects the next nearby device and returns to step 706.

Returning to step 706, if the first nearby device has joined a cluster, the device 102 then determines whether this nearby device is a cluster head in step 716. If yes, the device 102 joins the cluster in the next step 718 and determines if the joinder is successful in step 720. If no, the device 102 repeats step 718 until it either joins the cluster in step 720 or times out in step 722. If the joinder is successful in step 718, then the device 102 is established as a cluster member. If the device 102 times out in step 722, the device 102 then moves onto step 714 to determine whether the nearby device list has any remaining nearby devices to check for connection.

Returning to step 716, if the device determines that the nearby device is not cluster head, the device 102 then determines if the nearby device needs a cluster head in step 724. If yes, the device 102 establishes itself as the cluster head in step 726 and a cluster is created. If no, the device 102 determines whether the nearby device list is empty in step 714. If no, the device 102 selects the next nearby device in the nearby device list in step 728 and returns to step 706, inquiring about the new nearby device.

Figure 7:
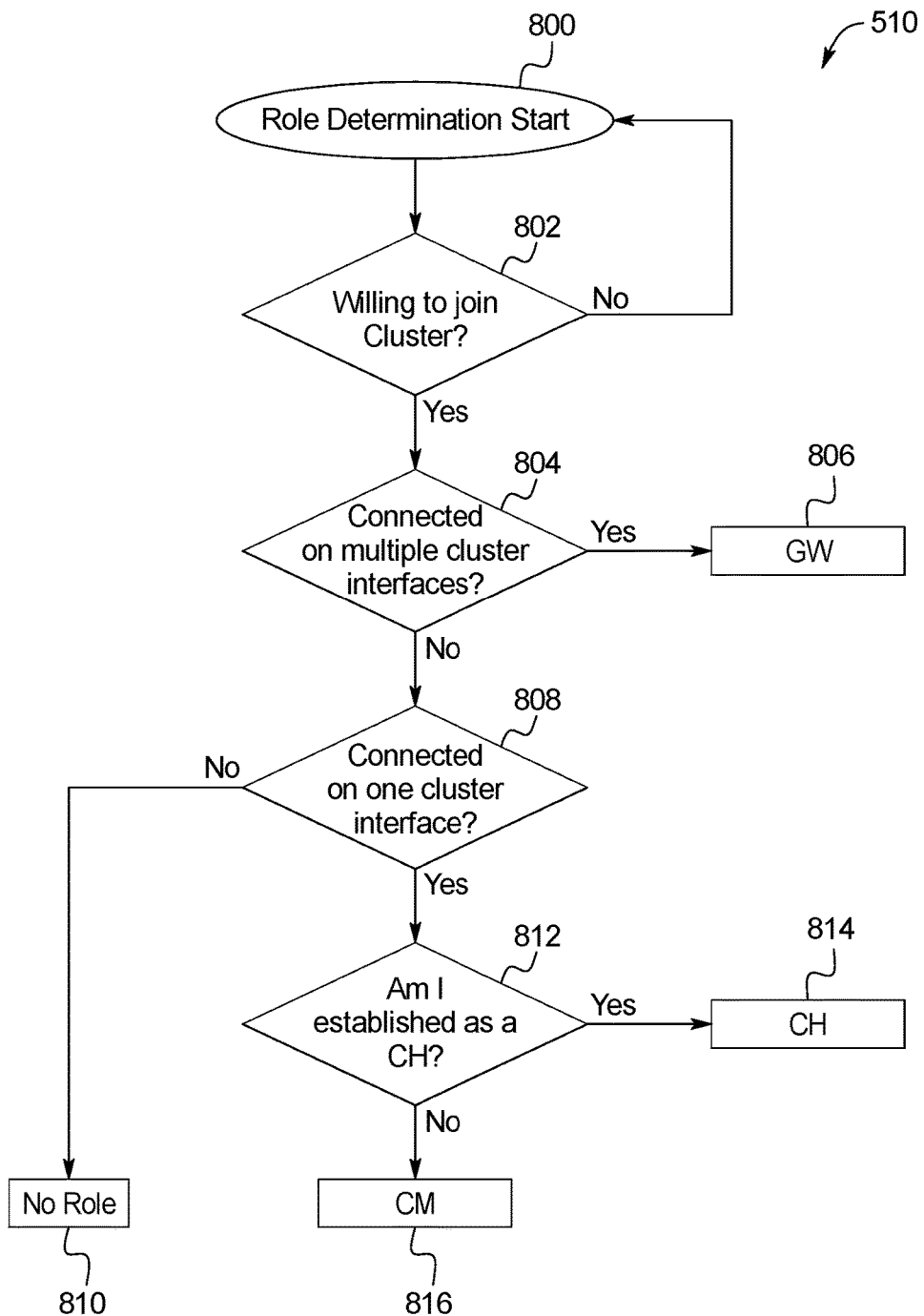
FIG. 7 is a flowchart illustrating a role determination session of the protocols of FIG. 4.

After the connection session 508, the device 102 runs the role determine session 510 to further establish its role as shown in FIG. 7. In the first step 800, the device 102 inputs its role as one of the following: no role, cluster head device, cluster member device, and gateway device. In the second step 802, the device 102 determines whether it is willing to join a cluster. If no, the device 102 returns to step 800. If yes, the device 102 determines whether it connects to multiple cluster interfaces in step 804. If yes, the role is established as a "gateway device" in step 806. If no, the device 102 determines whether it connects to a cluster as either a cluster member or a cluster head in step 808. If no, the role is assigned as "no role" in step 810. If yes, the device then determines whether it is established as the cluster head in step 812. If yes, the role is assigned as "cluster head" in step 814. If no, the role is assigned as "cluster member" in step 816.

Once the network setup 500 programming has determined a role for each device 102 in the network 100, each device 102 then implements the role execution function 502 based on which role the particular device 102 is assigned. For example, if a device 102 is assigned as a cluster head, it needs to run the cluster head protocols, such as becoming visible to nearby devices, allowing nearby devices to connect, routing data to nearby devices, etc.

After implementing the role execution function 502, each device 102 implements the routing and forwarding function 504 to construct a routing table based on the network topology. The network is dynamic, so the topology as well as the routing table may change. Data will be routed following the routing table at the moment when data arrives at a device. If the routing table changes in the middle of a transmission, the route will change accordingly.

During use, each wireless device identifies routing information between all of the devices in the ad-hoc network. More specifically, each wireless device identifies a plurality of inter-protocol routes between the wireless device and the other wireless devices in the network of wireless devices that are used to generate the routing table. As wireless devices are added or removed from the ad-hoc network, the routing of information between wireless devices in the network is updated to reflect routing changes. Similarly, each gateway device, which transmits data between two or more different communication protocols, also identifies a plurality of intra-protocol routes for transmitting data between two or more connection protocols of two or more clusters, respectively. The intra-protocol information is provided in a PBM table for each gateway device's, and the plurality of intra-protocol routes is continually updated as wireless devices are added or removed from the ad-hoc network.

Figure 8:
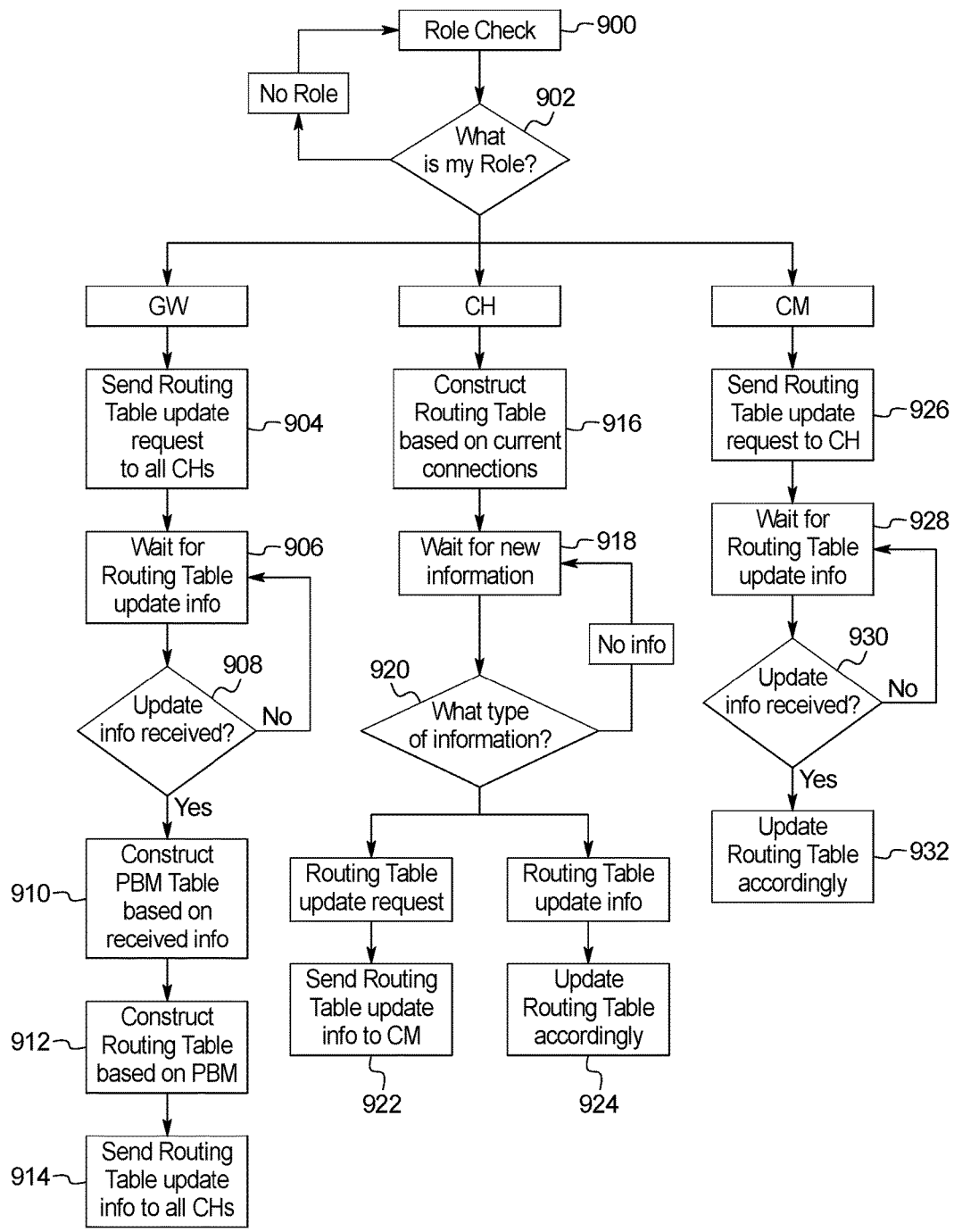
FIG. 8 is a flowchart illustrating a routing table and PBM setup of the protocols of FIG. 4.

Referring to the routing table and PBM setup flowchart in FIG. 8, the device first performs a role check at step 900 to confirm its role. If the role check is not confirmed, the device determines what its role is in step 902. If the role is "no role", then the device 102 returns to step 900. If the role is "gateway device", then the device requests each connected cluster head to send updated routing table information in step 904. At step 906, the device 102 waits to receive the updated routing table information from each cluster head. In step 908, the device 102 determines whether the updated routing table information has been received. If no, the device 102 returns to step 906. If yes, the device 102 constructs a PBM table based on the updated routing table information in step 910. The device 102 then constructs a routing table in step 912 based on the PBM table constructed in step 910. Finally, the device 102 sends the updated routing table information from step 912 to each connected cluster head in step 914.

If the device determines that its role is "cluster head" at step 902, the device then constructs a routing table based on current connections in step 916. In step 918, the device 102 waits for new information from one or more gateway devices. In the next step 920, the device 102 determines what type of information has been received. If no information is received, the device 102 returns to step 918. If the new information is a routing table update request, the device sends the updated routing table information to each cluster member in step 922. If the new information is updated routing table information from a connected device, the device 102 updates its routing table information in step 924 and then proceeds to step 922 to send the updated routing table information to each connected device.

If the device determines that its role is "cluster member" at step 902, the device then requests its cluster head to send updated routing table information in step 926. In the subsequent step 928, the device 102 waits for updated routing table information from its cluster head. In step 930, the device 102 determines whether updated routing table information has been received. If no, the device 102 returns to step 928. If yes, the device 102 updates its routing table.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A system for forming an ad-hoc network among devices comprising:
a wireless device that utilizes first and second connection protocols;
a protocol bridging mechanism (PBM) operating on one or more communication layers selected from the group of an application layer, a transport layer, a network layer, a data link layer, and a physical layer, wherein each of the first and second connection protocols operate on different communication layers, and wherein the first and second connection protocols connect through the protocol bridging mechanism;
a controller stored within the wireless device;
a network of wireless devices forming a plurality of clusters, each cluster operating on one of the first communication protocol, the second communication protocol, and a third communication protocol, wherein the network of wireless devices includes the wireless device, the first nearby wireless device, and the second nearby wireless device;
a memory within the wireless device and in communication with the controller, wherein the memory includes a routing table identifying a plurality of routes between the wireless device and the other wireless devices in the network of wireless devices and a PBM table identifying one or more routes between two or more connection protocols of two or more clusters, respectively, and wherein the memory including program instructions executable by the controller that, when executed by the controller, cause the controller to:
broadcast a signal to connect to a first nearby wireless device and a second nearby wireless device, wherein the signal indicates the first and second communication protocols of the wireless device;
connect to the first nearby wireless device through the first communication protocol;
connect to the second nearby wireless device through the second communication protocol; and
transmit data between the first nearby wireless device and the second nearby wireless device through the protocol bridging mechanism.

2. The system of claim 1, wherein the network of wireless devices is updated to add or remove one or more additional wireless devices, and wherein routing of information between different communication protocols as identified in the PBM table of the wireless device is continually updated to reflect changes in the network of wireless devices.

3. The system of claim 1, wherein each wireless device within the network of wireless devices is assigned a role from the group of:
no role;
a cluster member device connected to one or more cluster head devices;
a cluster head device connected to one or more cluster members of a cluster; and
a gateway device connected to two or more cluster head devices.

4. The system of claim 3, wherein the memory includes further program instructions that, when executed by the controller, cause the controller to:
    detect an additional wireless device;
    determine if the additional wireless device is part of a cluster;
    when the additional wireless device is not part of a cluster, assign the role of the cluster head device to one of the wireless device and the additional wireless device to create a cluster;
    when the additional wireless device is part of a cluster, determine whether the additional wireless device is a cluster head device of the cluster; and
    when the additional wireless device is a cluster head device of the cluster, join the cluster.

5. The system of claim 4, wherein the memory includes further program instructions that, when executed by the controller, cause the controller to:
    when the additional wireless device is a cluster member device of the cluster, determine whether the additional wireless device needs a cluster head device;
    when the additional wireless device needs a cluster head device, assign the role of the cluster head device to the wireless device to create a cluster.

6. The system of claim 3, wherein the memory includes further program instructions that, when executed by the controller, cause the controller to:
    determine if the wireless device utilizes two or more connection protocols;
    when the wireless device utilizes two or more connection protocols, assign the wireless device the role of a gateway device;
    when the wireless device does not utilize two or more connection protocols, determine if the wireless device is connected to a cluster on one connection protocol;
    when the wireless device is not connected to a cluster on one connection protocol, assign the wireless device the role of no role;
    when the wireless device is connected to a cluster on one connection protocol, determine if the wireless device is configured to connect to two or more additional wireless devices on one communication protocol;
    when the wireless device is configured to connect to two or more additional wireless devices on one communication protocol, assign the wireless device the role of the cluster head device; and
    when the wireless device is not configured to connect to two or more additional wireless devices on one communication protocol, assign the wireless device the role of cluster member.

7. The system of claim 6, wherein the memory includes further program instructions that, when executed by the controller, cause the controller to:
    construct a routing table identifying a plurality of routes between the wireless device and the other wireless devices in the network of wireless devices;
    when the wireless device is a cluster member of a cluster, request one or more route updates from a cluster head device of the cluster;
    receive the one or more route updates;
    update the routing table with the one or more route updates.

8. The system of claim 6, wherein the memory includes further program instructions that, when executed by the controller, cause the controller to:
    construct a routing table identifying a plurality of routes between the wireless device and the other wireless devices in the network of wireless devices;
    when the wireless device is a cluster head device of a cluster, receive one of a request for one or more route updates from a cluster member of the cluster and a route update from a gateway device of the cluster;
    when a request for one or more route updates from the cluster member is received, send one or more route updates to the cluster member; and
    when a route update from a gateway device is received, update the routing table with the one or more route updates.

9. The system of claim 6, wherein the memory includes further program instructions that, when executed by the controller, cause the controller to:
    when the wireless device is a gateway device of two or more clusters, request one or more route updates to each cluster head of the two or more clusters;
    receive the one or more route updates;
    identify a plurality of intra-protocol routes for transmitting data between two or more connection protocols of two or more clusters, respectively;
    generate a PBM table identifying the one or more routes between two or more connection protocols;
    identify a plurality of inter-protocol routes between the wireless device and the other wireless devices in the network of wireless devices;
    generate a routing table identifying the one or more routes between wireless devices within the network of wireless devices; and
    send the routing table to each cluster head of the two or more clusters.

10. The system of claim 9, wherein the network of wireless devices is updated to add or remove one or more additional wireless devices, and wherein the memory includes further program instructions that, when executed by the controller, cause the controller to:
    continually update the PBM table based on changes to the network of wireless devices.

11. A system for forming an ad-hoc network among devices comprising:
    a wireless device that utilizes first and second connection protocols;
    a protocol bridging mechanism (PBM) operating on one or more communication layers selected from the group of an application layer, a transport layer, a network layer, a data link layer, and a physical layer, wherein each of the first and second connection protocols operate on different communication layers, and wherein the first and second connection protocols connect through the protocol bridging mechanism;
    a controller stored within the wireless device;
    a network of wireless devices forming a plurality of clusters, each cluster operating on one of the first communication protocol, the second communication protocol, and a third communication protocol, and wherein the network of wireless devices includes the wireless device, the first nearby wireless device, and the second nearby wireless device, wherein each wireless device within the network of wireless devices is assigned a role from the group of:
        no role;
        a cluster member device connected to one or more cluster head devices;
        a cluster head device connected to one or more cluster members of a cluster; and a gateway device connected to two or more cluster head devices; and a memory within the wireless device and in communication with the controller, the memory including program instructions executable by the controller that, when executed by the controller, cause the controller to:

broadcast a signal to connect to a first nearby wireless device and a second nearby wireless device, wherein the signal indicates the first and second communication protocols of the wireless device;

connect to the first nearby wireless device through the first communication protocol;

connect to the second nearby wireless device through the second communication protocol;

transmit data between the first nearby wireless device and the second nearby wireless device through the protocol bridging mechanism;

detect an additional wireless device;

determine if the additional wireless device is part of a cluster;

when the additional wireless device is not part of a cluster, assign the role of the cluster head device to one of the wireless device and the additional wireless device to create a cluster;

when the additional wireless device is part of a cluster, determine whether the additional wireless device is a cluster head device of the cluster; and when the additional wireless device is a cluster head device of the cluster, join the cluster.

* * * * *